Feb. 10, 1931.  G. A. RAPTIS  1,791,602
CULTIVATOR
Filed March 12, 1930  5 Sheets-Sheet 2
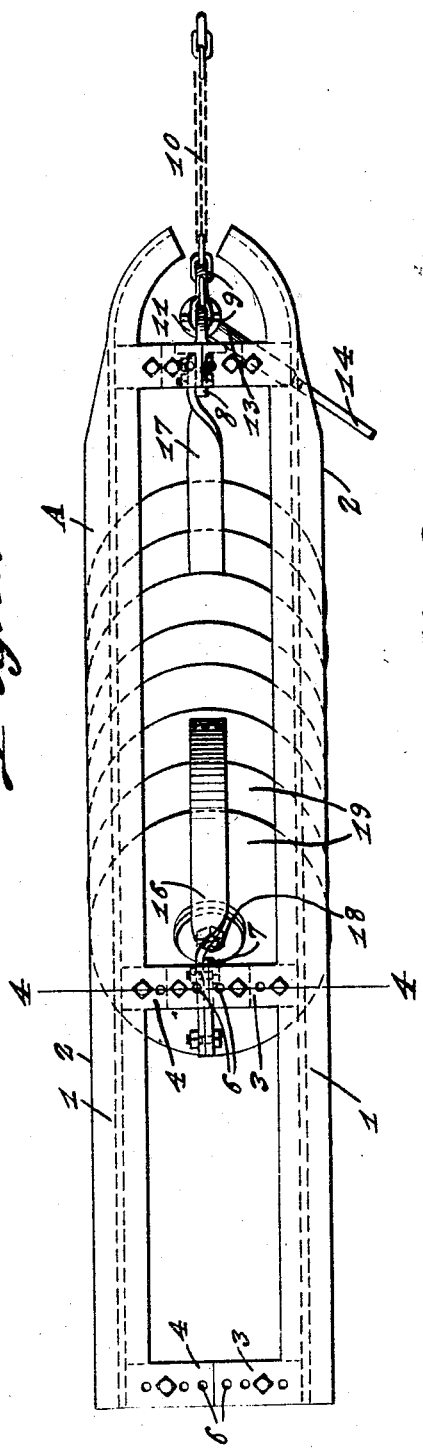
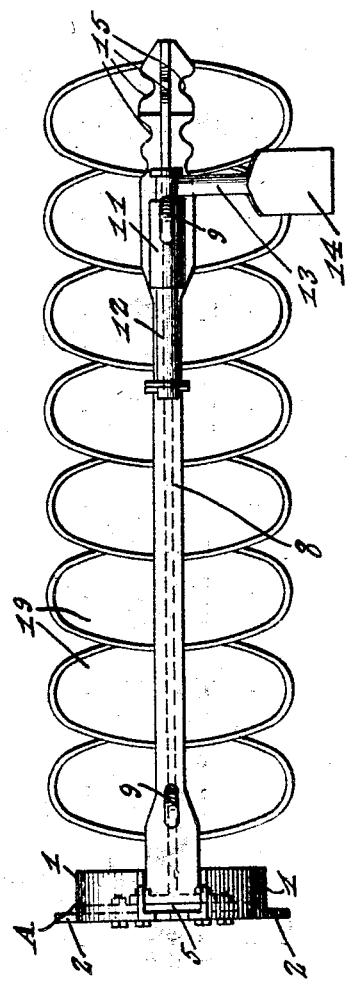
G. A. Raptis, INVENTOR
BY Victor J. Evans
ATTORNEY

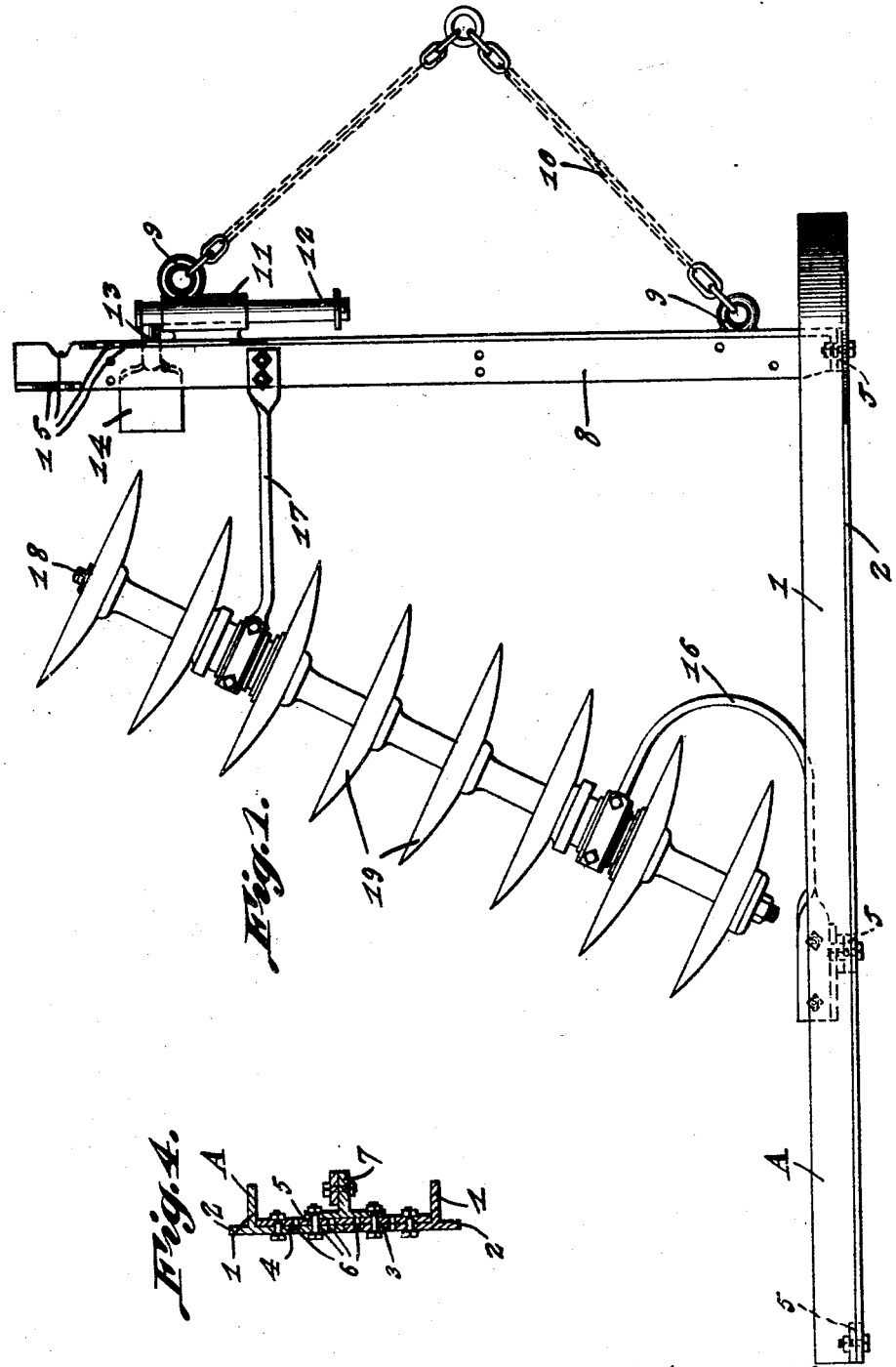

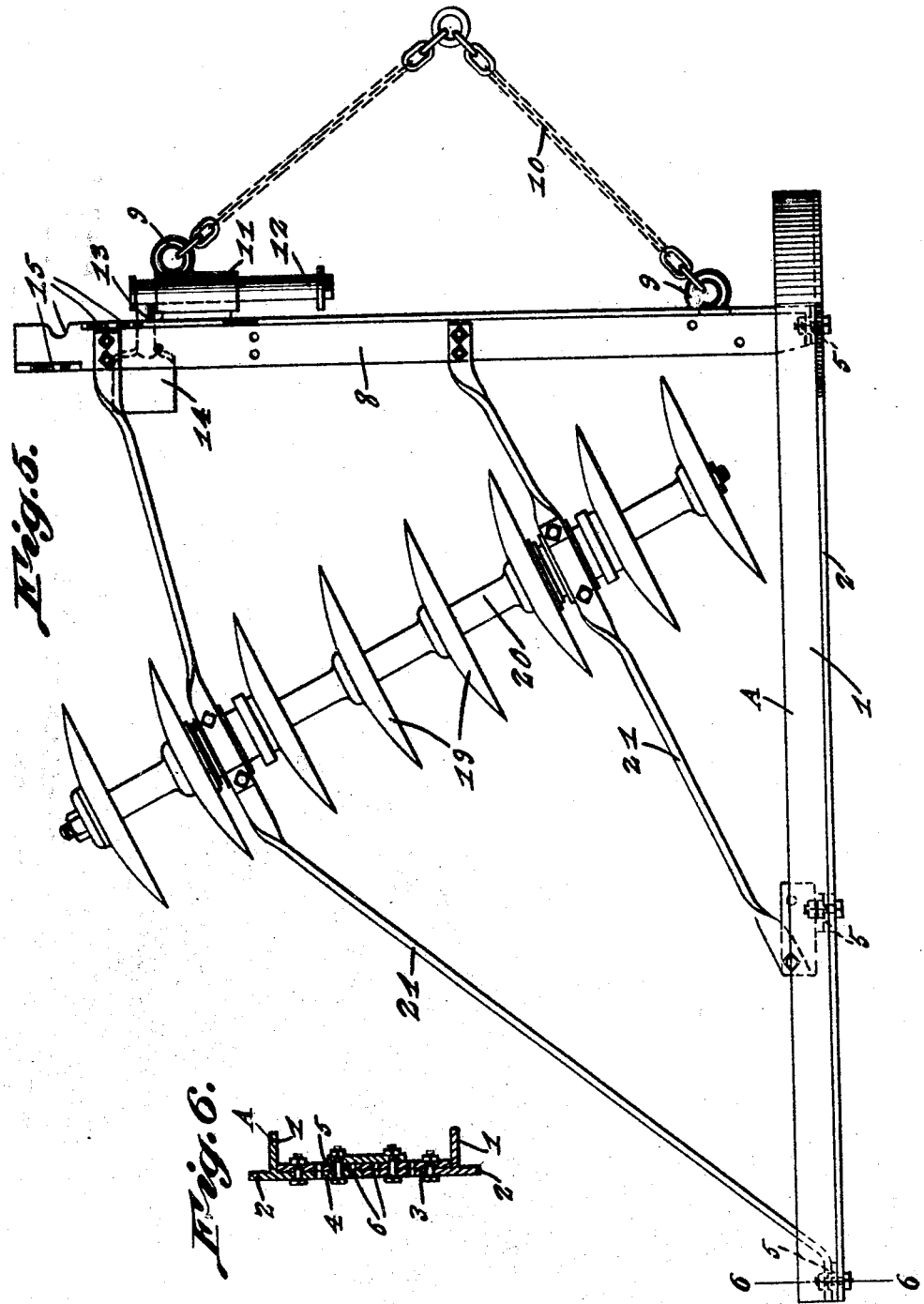

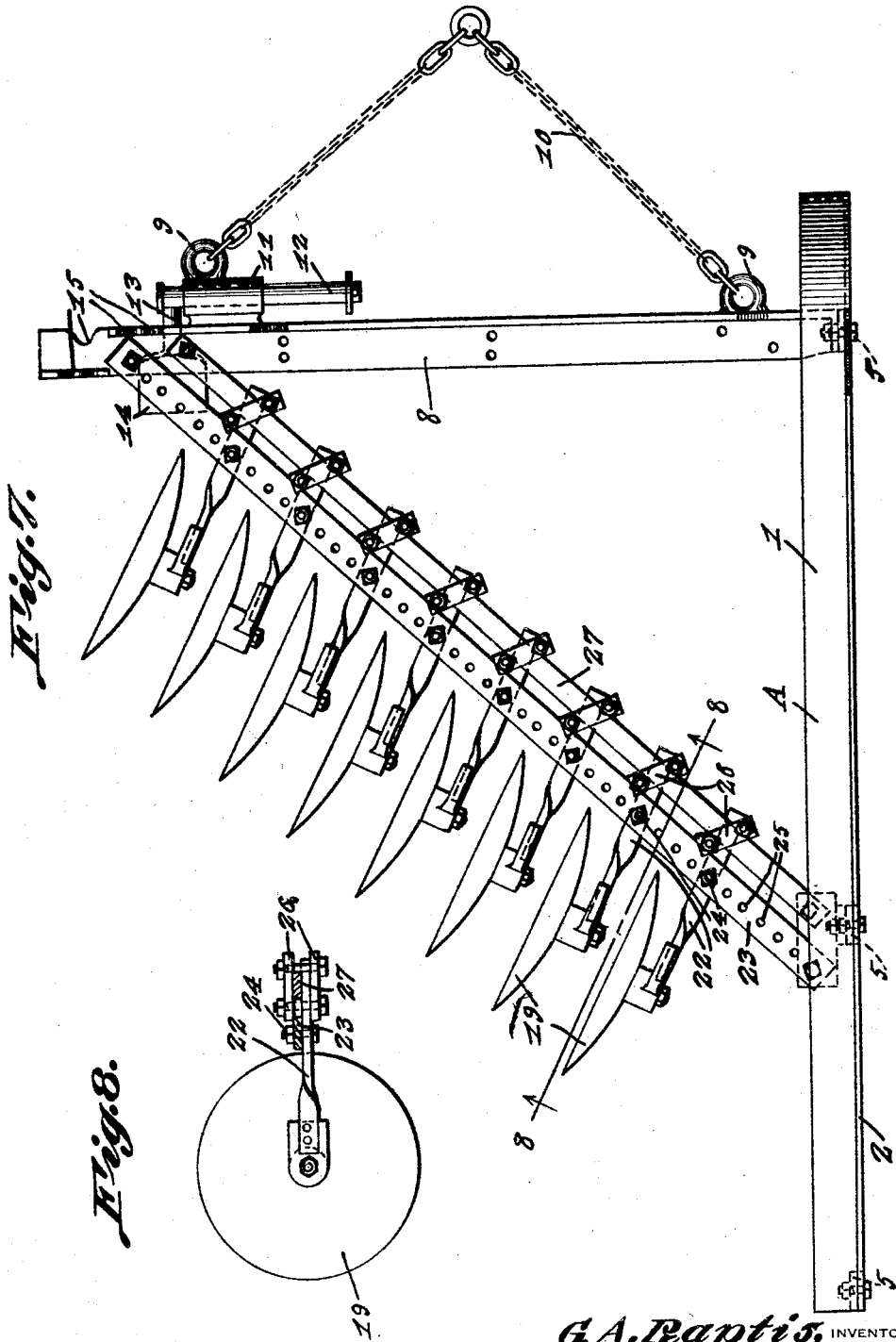

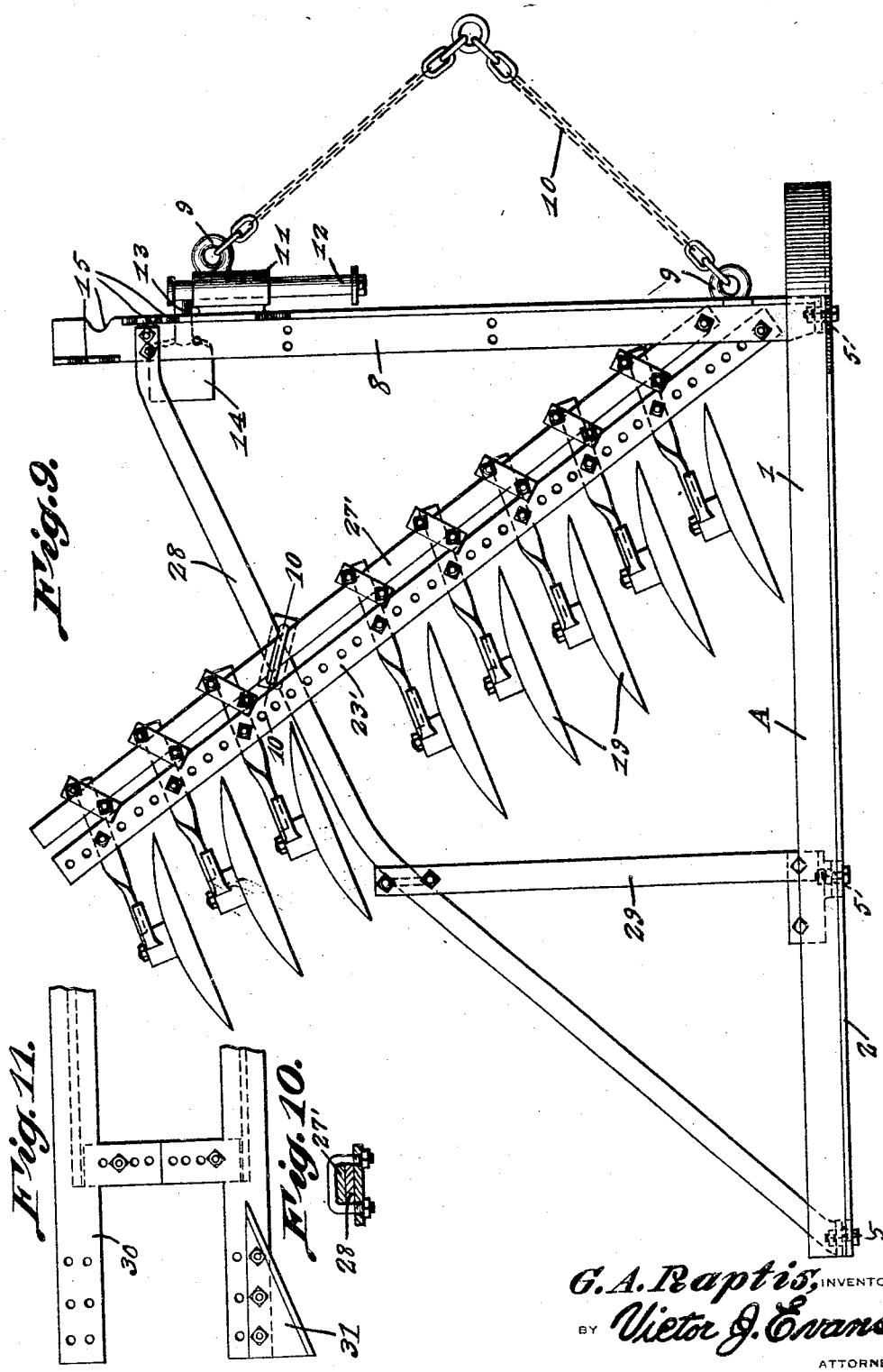

Patented Feb. 10, 1931

1,791,602

UNITED STATES PATENT OFFICE

GUST A. RAPTIS, OF CALEXICO, CALIFORNIA

CULTIVATOR

Application filed March 12, 1930. Serial No. 435,268.

This invention relates to a cultivator for use with crops grown on irrigated ground, where the plants are grown on the south side of and just below the top of borders or ridges, the present invention being an improvement over the invention forming the subject matter of my Patent No. 1,739,418, dated December 10, 1929.

An object of this invention is to provide a reversible sled having a front bar having one end connected with the sled, with means for supporting a shaft carrying cultivators diagonally between the bar and sled.

Another object of the invention is to provide an adjustable shoe at the outer end of the front bar for controlling the depth of cut of the cultivators and to make the shoe reversible so that the device can be reversed at the end of each trip.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which :—

Figure 1 is a plan view of one type of the cultivator.

Figure 2 is a side view of the same, looking toward the sled.

Figure 3 is a front view.

Figure 4 is a section on line 4—4 of Figure 2.

Figure 5 is a plan view showing another type of cultivator.

Figure 6 is a section on line 6—6 of Figure 5.

Figure 7 is a plan view of another type.

Figure 8 is a section on line 8—8 of Figure 7.

Figure 9 is a plan view of another form of the invention.

Figure 10 is a section on line 10—10 of Figure 9.

Figure 11 is a detail view showing a modification.

Referring to Figures 1, 2, 3 and 4, the letter A indicates a sled which is composed of the upper and lower runners 1, each formed of angle iron with its front end curved upwardly and its flat part having a depending flange 2 to cut into the ground to prevent the runner from slipping. The lower runner is formed with the upwardly extending arms 3 and the upper runner with the downwardly extending arms 4. Plates 5 are bolted to the registering pairs of arms to connect the runners together and the arms are each provided with a plurality of holes 6 to receive the bolt so that the distance apart of the runners can be adjusted. A bracket 7 is fastened to each of the front and middle plates 5 at the center thereof and a transverse bar 8 has one end fastened to the front bracket. Eyes 9 are formed on the front edge of this bar to receive the draft chain 10 and a sleeve 11 is formed on the front edge of the outer part of the bar to form a bearing for a shaft 12 to the outer end of which the stem 13 of a shoe 14 is connected. One eye 9 is formed on the sleeve. Graduated notches 15 are formed in the upper and lower edges of the outer end of the bar so that by moving the shaft in the sleeve, the stem of the shoe can be placed in any desired notch with the device in either one of its two positions, so that the shoe acts as a depth gauge for controlling the depth the cultivators enter the ground. By having the shaft rotate in the sleeve, the shoe can be reversed when the device is turned over, it being understood that the device is turned over at the end of each trip as the plants are grown on the south side of the borders.

A bowed member 16 has one end fastened to the bracket 7 of the central plate 5 and a member 17 extends rearwardly from the outer part of bar 8. These members form a support for the shaft 18 which carries the disks 19 and these members are so arranged that the shaft is diagonally arranged. Thus the disks will throw up a border of considerable width and when desired, some of the disks can be removed and substituted by shims.

In the form shown in Figures 5 and 6, the disk carrying shaft 20 is arranged with its inner end forwardly, instead of rearwardly, as in Figure 1, so that the border is cut down instead of being built up as in the first form. These figures also show the supporting members 21 for the shaft as connected with both the sled and the front bar and supporting the shaft intermediate their ends. In other respects, this form of the invention is similar to that first described.

In the form shown in Figures 7 and 8, the disks are connected to the arms 22 and these arms are pivoted to a bar 23 connected with the sled and the front bar, by the bolts 24 passing through some of the holes 25 in a row of holes in said bar 23. The front ends of the arms are clamped in adjusted position by the clamping plates 26 on a bar 27 which parallels the bar 23 and which is connected with the sled and the front bar. This arrangement of disks also builds up the border. This arrangement also permits the disks to be set at any desired cutting angle.

In the form shown in Figures 9 and 10, the bars 23' and 27' are oppositely arranged so that the disks will cut down the border. The bars 23' and 27' are fastened to the front bar and to a bar 28 which is fastened to the sled and the front bar and which is braced by a brace 29 fastened to the sled.

Thus it will be seen that I have provided a reversible implement, the depth of cut of the cultivators of which can be regulated and the parts of which can be raised or lowered to take care of borders of different heights.

With this invention, it is only necessary to go over crops once while the other methods require three or four times so that a great saving in labor is effected with this invention.

The sled may be formed with the extensions 30, as shown in Figure 11, to receive the shoe 31 which is provided with a beveled edge and is of triangular shape. This shoe acts to hold the sled in the furrow and as shown in Figure 11, it can be easily removed from one extension to the other when the device is turned over. Each extension is provided with two rows of holes to receive the bolts which connect the shoe to the extension so that the depth of penetration of the shoe can be regulated.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a reversible sled, a bar having one end connected with the front of the sled at the center thereof, a reversible shoe at the outer end of the bar, a disk carrying member and means for supporting the same in a diagonal position between the bar and sled.

2. A device of the class described comprising a reversible sled, a bar having one end connected with the front of the sled at the center thereof, a reversible shoe at the outer end of the bar, a disk carrying member, means for supporting the same in a diagonal position between the bar and sled, and means for adjusting the position of the shoe for regulating the depth of cut of the disks.

3. A device of the class described comprising a reversible sled, a bar having one end connected with the front of the sled at the center thereof, a reversible shoe at the outer end of the bar, a disk carrying member, means for supporting the same in a diagonal position between the bar and sled, and means for increasing or decreasing the height of the sled to regulate the distance of the disk carrying means from the ground.

4. A device of the class described comprising a reversible sled, a bar having one end connected with the front of the sled at the center thereof, a reversible shoe at the outer end of the bar, a disk carrying member, means for supporting the same in a diagonal position between the bar and sled, means for adjusting the position of the shoe for regulating the depth of cut of the disks, and means for increasing or decreasing the height of the sled to regulate the distance of the disk carrying means from the ground.

5. A device of the class described comprising a reversible sled, a bar having one end connected with the front of the sled at the center thereof, a reversible shoe at the outer end of the bar, a disk carrying member, means for supporting the same in a diagonal position between the bar and sled, and means for regulating the angle of cut of the disks.

In testimony whereof I affix my signature.

GUST A. RAPTIS.